3,221,034
3,3-DIFLUOROANDROSTANES
David G. Martin, Kalamazoo, Mich., assignor to The Upjohn Company, Kalamazoo, Mich., a corporation of Delaware
No Drawing. Filed Jan. 4, 1961, Ser. No. 80,531
7 Claims. (Cl. 260—397.5)

This invention relates to novel steroid compounds and is more particularly concerned with novel 3,3-difluoroandrostanes and with a process for the preparation thereof.

The novel compounds of the invention can be represented by the following formula:

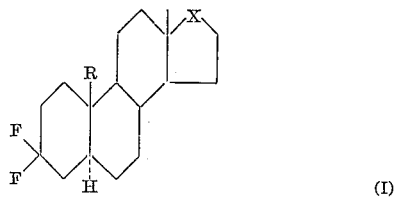

wherein R is selected from the class consisting of hydrogen and methyl and X is selected from the class consisting $>C=O$ and

wherein R' is selected from the class consisting of hydrogen and an aliphatic hydrocarbon group containing from 1 to 4 carbon atoms, inclusive, and R'' is selected from the class consisting of hydrogen and the acyl group of a lower hydrocarbon carboxylic acid containing from 1 to 12 carbon atoms, inclusive.

The term "aliphatic hydrocarbon group containing from 1 to 4 carbon atoms, inclusive" means a saturated or unsaturated straight or branched chain 1 to 4 carbon atom aliphatic hydrocarbon group and is inclusive of alkyl radicals such as methyl, ethyl, propyl, butyl, and isomeric forms thereof, alkenyl radicals such as vinyl, allyl, butenyl, and isomeric forms thereof, alkynyl radicals such as ethynyl, propynyl, butynyl and isomeric forms thereof, and cycloalkyl such as cyclopropyl and cyclobutyl.

The term "lower-hydrocarbon carboxlic acid" is inclusive of saturated and unsaturated aliphatic acids and aromatic acids containing up to 12 carbon atoms. Examples of such acids are acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, methylcyclopentenecarboxylic, cyclohexanecarboxylic, dimethylcyclohexanecarboxylic, cyclopentylacetic, cyclopentylpropionic, cyclohexylbutyric, benzoic, toluic, naphthoic, ethylbenzoic, phenylacetic, naphthaleneacetic, phenylvaleric, cinnamic, phenylpropiolic, and the like.

The novel compounds of the invention having the Formula I above possess useful therapeutic properties. Thus, the compounds of Formula I possess marked anabolic activity and low androgenic activity and hence are of particular advantage in cases where selective anabolic activity is required in mammals and birds, including valuable domestic animals. The novel compounds of the invention, because of their anabolic activity, are useful in increasing weight, and muscle strength, and for increasing the sense of well-being and for positive nitrogen balance in pituitary deficiencies. The novel compounds of Formula I affect the secretion of gonadotropins and thus regulate ovulation and endometrial and placental development and particularly when used in conjunction with estrogens, for example, ethinylestradiol and/or androgens, for example, Halotestin (9α-fluoro-11β-hydroxy-17-methyltestosterone), reduce fertility, and constitute effective therapy for dysmenorrhea, amenorrhea, endometriosis, threatened abortion and related gynecological disorders. The novel compounds of the Formula I also possess central nervous system depressant activity which makes them useful as sedatives and general anesthetics in mammals, particularly in animals. For example, they can be used as sedatives and anesthetics in the laboratory manipulation of experimental animals such as mice and rats.

The compounds of the Formula I can be prepared and administered in a wide variety of oral or parenteral dosage forms singly, or in admixture with other active compounds. They can be associated with a pharmaceutical carrier which can be solid material or a liquid in which the compound is dissolved, dispersed, or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

The novel compounds of the invention having the Formula I can be prepared according to the following reaction scheme:

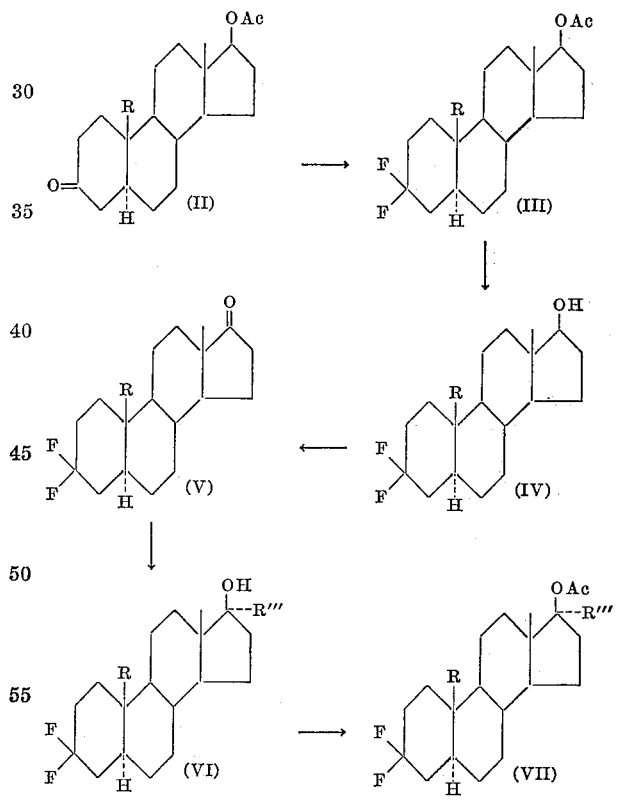

In the above formula, R has the significance hereinbefore defined, Ac represents the acyl radical of a lower-hydrocarbon carboxylic acid as hereinbefore defined, and R''' is an aliphatic hydrocarbon group containing from 1 to 4 carbon atoms as hereinbefore defined.

The compounds having the Formulas III, IV, V, VI and VII above represent the novel compounds of the invention encompassed with the generic Formula I previously given.

In carrying out the process of the invention, a compound of Formula II, i.e., a 5α-androstan-17β-ol-3-one acylate or a 19-nor-5α-androstan-17β-ol-3-one acylate, is subjected to fluorination by reaction with sulfur tetrafluoride in the presence of a Lewis acid to obtain the corresponding 3,3-difluoro compound of Formula III. The term "Lewis acid" is well-recognized in the art and is defined by Fieser and Fieser, "Organic Chemistry," Third Edition, page 138 (Reinhold, 1956). Examples of such compounds are hydrogen fluoride, boron trifluoride, arsenic trifluoride, phosphorus pentafluoride, titanium tetrafluoride, and the like. The preferred Lewis acid for use in the above reaction is hydrogen fluoride. The fluorination of the compound (II) is carried out by treating the latter with sulfur tetrafluoride in the presence of a Lewis acid and an inert solvent at a temperature within the range of about 0° C. and about 100° C.

The term "inert solvent" means any organic solvent which does not interfere with the fluorination process by entering into side reactions with any of the reactants employed therein. Such inert solvents include aromatic hydrocarbons such as benzene, toluene, xylene and the like, halogenated aromatic hydrocarbons such as bromobenzene, chlorobenzene, dichlorobenzene and the like, saturated aliphatic hydrocarbons such as hexane, heptane, octane, dodecane, cyclohexane, cycloheptane, and the like, and partially halogenated saturated hydrocarbons such as methylene chloride, ethylene dichloride, ethylidene chloride, propylene chloride, trimethylene chloride, and the like.

The fluorination of the compound (II) is carried out conveniently in a closed vessel, the inner surface of which is made of a material, such as stainless steel, which is resistant to chemical attack by the Lewis acid, e.g., hydrogen fluoride. The compound of Formula II, the inert solvent and the Lewis acid, are charged into the vessel in any order, but the sulfur tetrafluoride is generally charged in last. Where the Lewis acid to be employed is hydrogen fluoride, the requisite amount of hydrogen fluoride can be charged into the vessel from an external source or, alternatively and preferably, the desired quantity of hydrogen fluoride can be liberated in the reaction vessel by introducing therein an amount of water calculated to give the desired quantity of hydrogen fluoride by reaction with sulfur tetrafluoride according to the following equation:

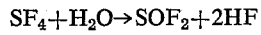

$$SF_4 + H_2O \rightarrow SOF_2 + 2HF$$

Sulfur tetrafluoride is a gas at ordinary temperatures, i.e., at temperatures of the order of 25° C., and can be introduced into the reaction vessel in a convenient manner by connecting a source of sulfur tetrafluoride to the reaction vessel and cooling the latter in, for example, an acetone and solid carbon dioxide bath. The amount of sulfur tetrafluoride passing into the reaction vessel can be measured by conventional procedures, for example, by observing the pressure drop over a constant volume reservoir.

The fluorination is allowed to proceed by maintaining the reaction vessel at the desired temperature, i.e., between about 0° C. and about 100° C. and preferably between about 10° C. and about 25° C. for the desired time which is generally between about 2 hr. and about 60 hr. The product (III) is isolated from the reaction mixture by conventional procedures. For example, the reaction mixture is diluted with a solvent, advantageously the same inert solvent used in the reaction process, the solution so obtained is washed with aqueous alkali and then evaporated to dryness. The residue is purified by conventional procedures such as recrystallization, chromatography, counter-current extraction or any combination of these steps.

The amount of Lewis acid employed in the fluorination is preferably not less than 1 mole per mole of compound (II). The upper limit of concentration of Lewis acid which can be employed is not critical and is determined by practical and economic considerations. Generally speaking, the upper limit is of the order of about 200 moles per mole of compound (II). Preferably the amount of Lewis acid employed is within the range of about 1.3 to about 20 moles per mole of compound (II).

The amount of sulfur tetrafluoride employed in the fluorination is advantageously not less than 2 moles per mole of compound (II). The upper limit of sulfur tetrafluoride to be employed in the process is not critical and is determined by practical and economical considerations. Generally speaking, the upper limit is of the order of about 500 moles per mole of compound (II). Preferably the amount of sulfur tetrafluoride employed in the process of the invention is within the range of about 13 to about 100 moles per mole of compound (II).

The ratio of sulfur tetrafluoride to Lewis acid employed in the fluorination is of course governed by the limitations defined above for the concentration of each of these reactants. However, using hydrogen fluoride as Lewis acid, the mole ratio of sulfur tetrafluoride to hydrogen fluoride is preferably in the range of from 1:0.01 to 1:3 and an especially desirable molar ratio is 1:0.22.

The next stage of the process of the invention consists in deacylation of the compound (III) to give the corresponding free 17-hydroxy compound (IV). The deacylation can be effected by conventional procedures, for example, by treatment with a mineral acid such as hydrochloric acid, hydrobromic acid, and the like in aqueous solution or preferably in solution in a lower alkanol such as methanol, ethanol, isopropanol, and the like. The deacylation is advantageously conducted at elevated temperatures, for example, at the boiling point of the solvent. The desired product (IV) can be isolated from the reaction mixture by conventional procedures, for example, by concentrating the reaction mixture after dilution with water, and crystallization of the desired compound from the concentrate. The compound (IV) so obtained can be purified, if desired, by conventional procedures, for example, by recrystallization.

The compound (IV) so obtained is then converted to the corresponding 17-keto compound (V) by oxidation using, for example, chromic acid, sodium dichromate, potassium dichromate and like oxidizing agents. The 17-keto compound (V) so obtained can be purified by conventional procedures, for example, by recrystallization.

The compound (V) so obtained is converted to the compound (VI) by reaction with the appropriate alkylating agent. Thus the compound (VI) wherein R''' is an alkly, alkenyl, or alkynyl radical can be obtained by reacting the compound (V) with the appropriate alkyl, alkenyl, or alkynyl magnesium halide in the presence of a solvent such as dimethyl ether, tetrahydrofuran and the like. Preferably, the Grignard reagent is employed in an excess of the order of 10 moles per mole of compound (V). The desired compound (VI) is isolated from the reaction mixture by conventional procedures, for example, by decomposition of the reaction mixture with water, ammonium chloride, and the like followed by solvent extraction. The compound (VI) can be purified, for example, by recrystallazation, chromatography, counter-current distribution and the like or any combination of these.

The compounds of Formula VI wherein R''' is a 1 to 4 carbon atom alkyl or alkenyl radical can also be obtained by reacting the corresponding compound (V) with the appropriate alkyl or alkenyl lithium compound in the presence of an inert solvent such as ether, benzene, toluene, and the like. The lithium compound is advantageously employed in excess of the stoichiometric proportion and is preferably employed in an amount of at least 1.5 moles per mole of compound (V). The reaction is advantageously conducted at elevated temperatures, suitably at the boiling point of the solvent employed. The desired compound (VI) can be isolated from the reaction mixture, for example, by decomposing the latter with water followed by solvent extraction and removal of solvent. The compound (VI) so obtained can be purified as described above.

The compounds having the Formula VI in which R''' represents a 2 to 4 carbon atom alkynyl group can be prepared by reacting the compound (V) with an alkali metal derivative, for example, the sodium or potassium derivative of the corresponding alkyne. The reaction is carried out in the presence of an inert solvent such as dimethylsulfoxide or dimethylformamide. The reaction mixture is decomposed, for example, by the addition of water and the desired compound (VI) is isolated therefrom, for example, by solvent extraction and can be purified as described above.

The compounds having the Formula VI in which R''' represents vinyl can be prepared from the corresponding compounds having the Formula VI wherein R''' represents ethynyl by hydrogenation of the latter compound, for example, using a palladium-on-calcium carbonate catalyst as described by Iriarte et al., J. Amer. Chem. Soc. 81, 436 (1959) for the preparation of 17α-vinyl-19-nor-$\Delta^{5(6)}$-androstene-3β,17β-diol from the corresponding 17α-ethinyl compound.

The compounds having the Formula VII can be prepared by acylation of the corresponding compounds having the Formula VI by procedures known in the art, for example, by reacting the latter with the appropriate acid anhydride or acid chloride of a lower-hydrocarbon carboxylic acid as hereinbefore defined, if desired, in the presence of a tertiary organic base such as pyridine.

The compounds having the Formula II employed as starting materials in the above-described process can be prepared by acylation of the known compounds 5α-androstan-17β-ol-3-one and 19-nor-5α-androstan-17β-ol-3-one, for example, by reacting the latter compounds with an acid halide or anhydride of a lower-hydrocarbon carboxylic acid, as hereinbefore defined, using the procedure described in British Patent 465,331 for the preparation of the acetate, propionate, butyrate, valerate, caproate, crotonate, and benzoate of 5α-androstan-17β-ol-3-one.

The following examples are illustrative of the process and products of the present invention, but are not to be construed as limiting.

PREPARATION 1

*19-nor-5α-androstan-17β-ol-3-one acetate*

A mixture of 1 g. of 19-nor-5α-androstan-17β-ol-3-one (Rapala and Farkas, J. Amer. Chem. Soc., 80, 1008, 1958) and 10 ml. of acetic anhydride is heated under reflux for 0.5 hr. The reaction mixture is distilled under reduced pressure to remove unreacted acetic anhydride. The residue is then recrystallized from aqueous methanol to give crystalline 19 - nor - 5α-androstan-17β-ol-3-one acetate.

In similar manner, by heating 19-nor-5α-androstan-17β-ol-3-one with the appropriate acid anhydride at a temperature of 100° C. to 150° C. there are obtained the propionate, butyrate, isobutyrate, valerate, caprylate, decanoate, crotonate, phenylacetate, and like lower-hydrocarbon acylates of 19-nor-5α-androstan-17β-ol-3-one.

EXAMPLE 1

*3,3-difluoro-5α-androstan-17β-ol 17-acetate*

A mixture of 5 g. of 5α-androstan-17β-ol-3-one acetate, 0.75 ml. of water and 20 ml. of methylene chloride was charged into a 100 ml. capacity stainless steel autoclave. The autoclave was sealed and cooled in a bath of Dry Ice and acetone and a total of 46 g. (0.43 mole) of sulfur tetrafluoride was passed into the autoclave. The contents of the autoclave were agitated for 16 hr. at a temperature of 15° C. before being diluted with methylene chloride and washed with aqueous potassium bicarbonate solution. The methylene chloride solution was dried over anhydrous sodium sulfate and filtered. The filtrate was evaporated to dryness and the residue was chromatographed on a column of magnesium silicate (Florisil). The column was eluted firstly with Skellysolve B (a mixture of hexanes) and then with a mixture of equal parts of Skellysolve B and methylene dichloride. The eluate obtained using the latter eluent was evaporated to dryness and the residue was recrystallized from a mixture of acetone and water. There was thus obtained 4.35 g. of 3,3-difluoro-5α-androstan-17β-ol 17-acetate in the form of a crystalline solid having a melting point of 132 to 134° C. An analytical sample having a melting point of 136.5 to 138° C. and $[\alpha]_D+2°$ (chloroform) was obtained by further recrystallization from a mixture of acetone and water.

*Analysis.*—Calcd. for $C_{21}H_{32}O_2F_2$: C, 71.15; H, 9.10; F, 10.72. Found: C, 71.08; H, 9.39; F, 10.37.

In similar manner, but replacing 5α-androstan-17β-ol-3-one acetate by the corresponding propionate, cyclopentylpropionate, butyrate, isobutyrate, valerate, caprylate, or decanoate, there are obtained the 17-propionate, 17-cyclopentylpropionate, 17-butyrate, 17-isobutyrate, 17-valerate, 17-caprylate, and 17-decanoate, respectively, of 3,3-difluoro-5α-androstan-17β-ol.

EXAMPLE 2

*3,3-difluoro-5α-androstan-17β-ol*

A solution of 3.20 g. of 3,3-difluoro-5α-androstan-17β-ol acetate in a mixture of 500 ml. of methanol and 48 ml. of concentrated hydrochloric acid was heated under reflux for 0.5 hr. and then diluted with 100 ml. of water before being concentrated under reduced pressure to a volume of approximately 125 ml. The concentrate was cooled and the solid which separated was isolated by filtration, washed with water and dried. There was thus obtained 2.76 g. of 3,3-difluoro-5α-androstan-17β-ol in the form of a crystalline solid having a melting point of 153 to 155° C. An analytical sample having a melting point of 154 to 156° C. and $[\alpha]_D+9°$ (chloroform) was obtained by recrystallization from aqueous acetone.

*Analysis.*—Calcd. for $C_{19}H_{30}F_2O$: F, 12.16. Found: F, 12.03.

3,3-difluoro-5α-androstan-17β-ol is also obtained using the above procedure but replacing 3,3-difluoro-5α-androstan-17β-ol 17 acetate by the corresponding 17-propionate, 17-butyrate, 17-isobutyrate, 17-valerate, 17-caprylate, 17-decanoate, and like 17-acylates of 3,3-difluoro-5α-androstan-17β-ol.

EXAMPLE 3

*19-nor-3,3-difluoro-5α-androstan-17β-ol 17-acetate*

Using the procedure described in Example 1, but replacing androstan-17β-ol-3-one 17 acetate by 19-nor-5α-androstan-17β-ol-3-one 17-acetate, there is obtained 19-nor-3,3-difluoro-5α-androstan-17β-ol 17-acetate.

In similar manner, but replacing 19-nor-5α-androstan-17β-ol-3-one 17-acetate by the corresponding 17-propionate, 17-butyrate, 17-isobutyrate, 17-valerate, 17-caprylate, or 17-decanoate, there are obtained 19-nor-3,3-difluoro-5α-androstan-17β-ol-3-one 17-propionate, 17-butyrate, 17-isobutyrate, 17-valerate, 17-caprylate and 17-decanoate, respectively.

EXAMPLE 4

*19-nor-3,3-difluoro-5α-androstan-17β-ol*

Using the procedure described in Example 2, but replacing 3,3-difluoro-5α-androstan-17β-ol 17-acetate by 19-nor-3,3-difluoro-5α-androstan-17β-ol 17-acetate, there is obtained 19-nor-3,3-difluoro-5α-androstan-17β-ol.

EXAMPLE 5

*3,3-difluoro-5α-androstan-17-one*

A solution of 2.76 g. of 3,3-difluoro-5α-androstan-17β-ol in 150 ml. of acetone was maintained at 15 to 20° C. and stirred vigorously while adding 4 ml. of a solution, prepared by dissolving 26.72 g. of chromium trioxide in 23 ml. of concentrated sulfuric acid and sufficient water to make a final volume of 100 ml. The resulting mixture was stirred for a further 5 minutes before being diluted with 100 ml. of water and concentrated to half volume under reduced pressure. An additional 250 ml. of water was added to the concentrate and the mixture was cooled to 0° C. The solid which separated was isolated by filtration, washed with water and dried. There was thus obtained 2.69 g. of 3,3-difluoro-5α-androstan-17-one in the form of a crystalline solid having a melting point of 119 to 120° C. An analytical sample having a melting point of 123 to 125° C. and $[\alpha]_D$ +83° (chloroform) was obtained by recrystallization from aqueous acetone.

Example 6

*19-nor-3,3-difluoro-5α-androstan-17-one*

Using the procedure described in Example 5, but substituting 19-nor-3,3-difluoro-5α-androstan-17β-ol for 3,3-difluoro-5α-androstan-17β-ol, there is obtained 19-nor-3,3-difluoro-5α-androstan-17β-one.

Example 7

*3,3-difluoro-17α-methyl-5α-androstan-17β-ol*

A solution of 2.49 g. of 3,3-difluoro-5α-androstan-17-one in 70 ml. of tetrahydrofuran was added over a period of 10 minutes with stirring under an atmosphere of nitrogen to 25 ml. of a 3 molar solution of methylmagnesium bromide in diethyl ether. The resulting mixture was distilled until the vapor temperature reached 60° C. and the remaining mixture was then heated under reflux for 18 hrs. The mixture so obtained was cooled was cooled and carefully treated with 10 ml. of water before being acidified by the addition of hydrochloric acid and extracted with three 100 ml. portions of ether. The ether extracts were combined and washed successively with water, aqueous sodium bicarbonate solution, and water. The washed ether solution was dried over anhydrous sodium sulfate, filtered, and the filtrate evaporated to dryness. The residue was dissolved in methylene chloride and chromatographed over a column of magnesium silicate (Florisil). The column was eluted with Skellysolve B containing increasing proportions of acetone and those fractions which did not exhibit absorption in the infrared corresponding to a 17-keto group were combined and recrystallized from aqueous acetone to yield 1.355 g. of 3,3-difluoro-17α-methyl-5α-androstan-17β-ol in the form of a crystalline solid having a melting point of 183° C., with decomposition, and $[\alpha]_D$ −10° (chloroform).

*Analysis.*—Calcd. for $C_{20}H_{32}F_2O$: C, 73.58; H, 9.88; F, 11.64. Found: C, 73.79; H, 10.11; F, 11.56.

In similar manner, but replacing methylmagnesium bromide with ethylmagnesium bromide, propylmagnesium bromide or isobutylmagnesium bromide, chromatographing the product, and combining those fractions lacking 17-ketone absorption in the infrared, there are obtained 3,3-difluoro-17α-ethyl-5α-androstan-17β-ol, 3,3-difluoro-17α-propyl-5α-androstan-17β-ol, and 3,3-difluoro-17α-isobutyl-5α-androstan-17β-ol, respectively.

Example 8

*3,3-difluoro-17α-ethynyl-5α-androstan-17β-ol*

A 15 ml. portion of a 20% suspension of sodium acetylide in xylene (prepared by passing acetylene into a solution of sodium in liquid ammonia, allowing the liquid ammonia to evaporate, adding xylene slowly to the suspension during the evaporation and adjusting the volume of the final suspension by addition of the appropriate amount of xylene) was centrifuged and the supernatant liquor was removed by decantation. The residue was transferred to a flask using 30 ml. of dimethylsulfoxide for washing. The resulting slurry was stirred while a mixture of 3 g. of 3,3-difluoro-5α-androstan-17-one in 75 ml. of dimethylsulfoxide was added. The flask was protected from atmospheric moisture and the mixture was stirred at approximately 25° C. for 2.5 hrs. The resulting mixture was then poured onto ice, diluted with water and the pH was adjusted to 6.0 by the addition of acetic acid. The solid which separated was isolated by filtration, washed with water, and dried. The material (2.58 g.) so obtained was dissolved in 200 ml. of methylene chloride and the resulting solution was filtered through a column of 65 g. of synthetic magnesium silicate (Florisil). The column was eluted with 1 l. of methylene chloride and the eluate was concentrated to approximately 75 ml. before being treated with excess Skellysolve B. There was thus obtained 1.82 g. of 3,3-difluoro-17α-ethynyl-5α-androstan-17β-ol in the form of a crystalline solid having a melting point of 238 to 240° C. and $[\alpha]_D$ −35° (chloroform).

*Analysis.*—Calcd. for $C_{21}H_{30}F_2O$: C, 74.96; H, 8.99; F, 11.29. Found: C, 75.25; H, 9.09; F, 11.63.

Example 9

*3,3-difluoro-17α-(1-propynyl)-5α-androstan-17β-ol*

Using the procedure described in Example 8, but replacing the suspension of sodium acetylide in xylene by an equivalent amount of a suspension of sodium methylacetylide (prepared from sodium and propyne in liquid ammonia solution) in xylene, there is obtained 3,3-difluoro-17α-(1-propynyl)-5α-androstan-17β-ol.

Example 10

*3,3-difluoro-17α-(1-butynyl)-5α-androstan-17β-ol*

Using the procedure described in Example 8, but replacing the suspension of sodium acetylide in xylene by an equivalent amount of a suspension of sodium ethylacetylide (prepared from sodium and butyne-1 in liquid ammonia solution) in xylene, there is obtained 3,3-difluoro-17α-(1-butynyl)-5α-androstan-17β-ol.

Example 11

*3,3-difluoro-17α-(2-butenyl)-5α-androstan-17β-ol*

A solution of 0.1 mole of 2-butenylmagnesium bromide in 30 ml. of diethyl ether is prepared according to the method of Young and Roberts, J. Amer. Chem. Soc., 68, 1474, 1946, and is stirred under a nitrogen atmosphere while a solution of 3.1 g. of 3,3-difluoro-5α-androstan-17-one in 50 ml. of tetrahydrofuran is added over a period of 10 minutes. The mixture is distilled until the vapor temperature reaches approximately 55° C. and the residue is heated under reflux for 4 hrs. The mixture so obtained is cooled and poured into a mixture of ice and ammonium chloride solution. The resulting mixture is extracted with ether and the ether extract is washed with water and dried over anhydrous sodium sulfate. The dried solution is filtered and the filtrate is evaporated to dryness under reduced pressure. The residue is dissolved in methylene chloride and chromatographed over a column of magnesium silicate (Florisil). The column is eluted with Skellysolve B containing increasing proportions of acetone from 1 to 50% by volume. The eluted fractions are evaporated and the residues are examined by infrared absorption analysis. Those fractions which show no C-17 carbonyl absorption are combined and crystallized from a mixture of acetone and Skellysolve B. There is thus obtained 3,3-difluoro-17α-(2-butenyl)-5α-androstan-17β-ol.

Example 12

*3,3-difluoro-17α-allyl-5α-androstan-17β-ol*

Using the procedure described in Example 11, but replacing 2-butenylmagnesium bromide by allylmagnesium bromide (prepared from allylbromide according to the procedure of Young and Roberts, supra), there is obtained 3,3-difluoro-17α-allyl-5α-androstan-17β-ol.

EXAMPLE 13

*3,3-difluoro-17α-vinyl-5α-androstan-17β-ol*

A solution of 1 g. of 3,3-difluoro-17α-ethynyl-5α-androstan-17β-ol in 50 ml. of pyridine is hydrogenated in the presence of 0.1 g. of a 2% palladium-on-calcium carbonate catalyst at approximately 25° C. When the uptake of hydrogen is approximately theoretical the catalyst is removed by filtration and the filtrate is evaporated to dryness under reduced pressure. The residue is recrystallized from a mixture of acetone and Skellysolve B. There is thus obtained 3,3 - difluoro - 17α - vinyl-5α-androstan-17β-ol.

EXAMPLE 14

*19-nor-3,3-difluoro-17α-methyl-5α-androstan-17β-ol*

Using the procedure described in Example 7, but substituting 19-nor-3,3-difluoro-5α-androstan-17-one for 3,3-difluoro-5α-androstan-17-one, there is obtained 19-nor-3,3-difluoro-17α-methyl-5α-androstan-17β-ol.

EXAMPLE 15

*19-nor-3,3-difluoro-17α-ethynyl-5α-androstan-17β-ol*

Using the procedure described in Example 8, but substituting 19-nor-3,3-difluoro-5α-androstan-17-one for 3,3-difluoro-5α-androstan-17-one, there is obtained 19-nor-3,3-difluoro-17α-ethynyl-5α-androstan-17β-ol.

EXAMPLE 16

*19-nor-3,3-difluoro-17α-(2-butenyl)-5α-androstan-17β-ol*

Using the procedure described in Example 11, but substituting 19-nor-3,3-difluoro-5α-androstan-17-one for 3,3-difluoro-5α-androstan-17-one, there is obtained 19-nor-3,3-difluoro-17α-(2-butenyl)-5α-androstan-17β-ol.

EXAMPLE 17

*19-nor-3,3-difluoro-17α-allyl-5α-androstan-17β-ol*

Using the procedure described in Example 11, but substituting 19-nor-3,3-difluoro-5α-androstan-17-one for 3,3-difluoro-5α-androstan-17-one and allylmagnesium bromide for 2-butenylmagnesium bromide, there is obtained 19-nor-3,3-difluoro-17α-allyl-5α-androstan-17β-ol.

EXAMPLE 18

*19-nor-3,3-difluoro-17α-(1-propynyl)-5α-androstan-17β-ol*

Using the procedure described in Example 8, but replacing 3,3-difluoro-5α-androstan-17-one by 19-nor-3,3-difluoro-5α-androstan-17-one and sodium acetylide by sodium methylacetylide, there is obtained 19-nor-3,3-difluoro-17α-(1-propynyl)-5α-17β-ol.

EXAMPLE 19

*3,3-difluoro-17α-methyl-5α-androstan-17β-ol 17-acetate*

A mixture of 1 g. of 3,3-difluoro-17α-methyl-5α-androstan-17β-ol, 20 ml. of acetic anhydride and 1 ml. of pyridine is stirred and heated at 140° C. for 1 hr. under a nitrogen atmosphere. The reaction mixture is then cooled to room temperature and stirred with 100 ml. of water for 2 hrs. The solid which separates is isolated by filtration and recrystallized from aqueous methanol. There is thus obtained 3,3-difluoro-17α-methyl-5α-androstan-17β-ol 17-acetate.

Similarly, by reacting 3,3-difluoro-17α-methyl-5α-androstan-17β-ol with the appropriate hydrocarbon carboxylic acid anhydride, for example, at temperatures between about 120° C. and 150° C., there are produced other 17-acylates such as 3,3-difluoro-17α-methyl-5α-androstan-17β-ol 17-propionate,
3,3-difluoro-17α-methyl-5α-androstan-17β-ol 17-butyrate,
3,3-difluoro-17α-methyl-5α-androstan-17β-ol 17-valerate,
3,3-difluoro-17α-methyl-5α-androstan-17β-ol 17-hexanoate,
3,3-difluoro-17α-methyl-5α-androstan-17β-ol 17-trimethylacetate,
3,3-difluoro-17α-methyl-5α-androstan-17β-ol 17-isobutyrate,
3,3-difluoro-17α-methyl-5α-androstan-17β-ol 17-isovalerate,
3,3-difluoro-17α-methyl-5α-androstan-17β-ol 17-cyclohexanecarboxylate,
3,3-difluoro-17α-methyl-5α-androstan-17β-ol 17-cyclopentylpropionate,
3,3-difluoro-17α-methyl-5α-androstan-17β-ol 17-benzoate,
3,3-difluoro-17α-methyl-5α-androstan-17β-ol 17-(o-, m-, p-toluate),
3,3-difluoro-17α-methyl-5α-androstan-17β-ol 17-hemisuccinate,
3,3-difluoro-17α-methyl-5α-androstan-17β-ol 17-phenylacetate,
3,3-difluoro-17α-methyl-5α-androstan-17β-ol 17-acrylate,
3,3-difluoro-17α-methyl-5α-androstan-17β-ol 17-crotonate,
3,3-difluoro-17α-methyl-5α-androstan-17β-ol 17-undecylenate,
3,3-difluoro-17α-methyl-5α-androstan-17β-ol 17-propiolate,
3,3-difluoro-17α-methyl-5α-androstan-17β-ol 17-cinnamate,
3,3-difluoro-17α-methyl-5α-androstan-17β-ol 17-maleate, and
3,3-difluoro-17α-methyl-5α-androstan-17β-ol 17-citraconate.

Similarly, by reacting other 3,3-difluoro-17α-(aliphatic hydrocarbon substituted)-5α-androstan-17β-ols with the appropriate hydrocarbon carboxylic acid anhydride there are obtained the corresponding 17-acylates such as 3,3-difluoro-17α-ethynyl-5α-androstan-17β-ol 17-acetate,
3,3-difluoro-17α-ethynyl-5α-androstan-17β-ol 17-propionate,
3,3-difluoro-17α-androstan-17β-ol 17-cyclopentylpropionate,
3,3-difluoro-17α-ethyl-5α-androstan-17β-ol 17-acetate,
3,3-difluoro-17α-propyl-5α-androstan-17β-ol 17-propionate,
3,3-difluoro-17α-isobutyl-5α-androstan-17β-ol 17-benzoate,
3,3-difluoro-17α-allyl-5α-androstan-17β-ol 17-acetate,
3,3-difluoro-17α-(2-butenyl)-5α-androstan-17β-ol 17-acetate and
3,3-difluoro-17α-vinyl-5α-androstan-17β-ol 17-acetate.

EXAMPLE 20

*19-nor-3,3-difluoro-17α-methyl-5α-androstan-17β-ol 17-acetate*

A mixture of 1 g. of 19-nor-3,3-difluoro-17α-methyl-5α-androstan-17β-ol, 20 ml. of acetic anhydride and 1 ml. of pyridine is stirred and heated at 140° C. for 1 hr. under a nitrogen atmosphere. The reaction mixture is then cooled to room temperature and stirred with 100 ml. of water for 2 hr. The solid which separates is isolated by filtration and recrystallized from aqueous methanol. There is thus obtained 19-nor-3,3-difluoro-17α-methyl-5α-androstan-17β-ol 17-acetate.

Similarly, by reacting 19-nor-3,3-difluoro-17α-methyl-5α-androstan-17β-ol with the appropriate hydrocarbon carboxylic acid anhydride, for example, at temperatures between about 120° C. and 150° C. there are produced other 17-acylates thereof such as 19-nor-3,3-difluoro-17α-methyl-5α-androstan-17β-ol 17-propionate,
19-nor-3,3-difluoro-17α-methyl-5α-androstan-17β-ol 17-butyrate,
19-nor-3,3-difluoro-17α-methyl-5α-androstan-17β-ol 17-valerate, 19-nor-3,3-difluoro-17α-methyl-5α-androstan-17β-ol 17-hexanoate,
19-nor-3,3-difluoro-17α-methyl-5α-androstan-17β-ol 17-trimethylacetate,
19-nor-3,3-difluoro-17α-methyl-5α-androstan-17β-ol 17-isobutyrate,
19-nor-3,3-difluoro-17α-methyl-5α-androstan-17β-ol 17-isovalerate,
19-nor-3,3-difluoro-17α-methyl-5α-androstan-17β-ol 17-cyclohexanecarboxylate,
19-nor-3,3-difluoro-17α-methyl-5α-androstan-17β-ol 17-benzoate,
19-nor-3,3-difluoro-17α-methyl-5α-androstan-17β-ol 17-(o-, m-, p-toluate),
19-nor-3,3-difluoro-17α-methyl-5α-androstan-17β-ol 17-hemisuccinate,
19-nor-3,3-difluoro-17α-methyl-5α-androstan-17β-ol 17-phenylacetate,
19-nor-3,3-difluoro-17α-methyl-5α-androstan-17β-ol 17-acrylate,
19-nor-3,3-difluoro-17α-methyl-5α-androstan-17β-ol 17-crotonate,
19-nor-3,3-difluoro-17α-methyl-5α-androstan-17β-ol 17-undecylenate,
19-nor-3,3-difluoro-17α-methyl-5α-androstan-17β-ol 17-propiolate,
19-nor-3,3-difluoro-17α-methyl-5α-androstan-17β-ol 17-cinnamate,
19-nor-3,3-difluoro-17α-methyl-5α-androstan-17β-ol 17-maleate, and
19-nor-3,3-difluoro-17α-methyl-5α-androstan-17β-ol 17-citraconate.

Similarly, by reacting other 19-nor-3,3-difluoro-17α-(aliphatic hydrocarbon substituted)-5α-androstan-17β-ols with the appropriate hydrocarbon carboxylic acid anhydride there are obtained the corresponding 17-acylates such as 19-nor-3,3-difluoro-17α-ethynyl-5α-androstan-17β-ol 17-acetate, 19-nor-3,3-difluoro-17α-ethyl-5α-androstan-17β-ol 17-acetate, 19-nor-3,3-difluoro-17α-allyl-5α-androstan-17β-ol 17-acetate, and 19-nor-3,3-difluoro-17α-(2-butenyl)-5α-androstan-17β-ol 17-acetate.

I claim:
1. 3,3-difluoro-17α-methyl-5α-androstan-17β-ol.
2. 3,3-difluoro-17α-ethynyl-5α-androstan-17β-ol.
3. 3,3-difluoro-17α-methyl-5α-androstan-17β-ol 17-acylates wherein the acyl radical is that of a hydrocarbon carboxylic acid containing from 1 to 12 carbon atoms, inclusive.
4. 3,3-difluoro-17α-ethynyl-5α-androstan-17β-ol 17-acylates wherein the acyl radical is that of a hydrocarbon carboxylic acid containing from 1 to 12 carbon atoms, inclusive.
5. A 3,3-difluoro compound having the formula:

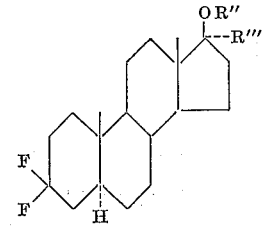

wherein R″ is selected from the class consisting of hydrogen and the acyl group of a hydrocarbon carboxylic acid containing from 1 to 12 carbon atoms, inclusive, and R‴ is an alkyl radical containing from 1 to 4 carbon atoms inclusive.

6. A 3,3-difluoro compound having the formula:

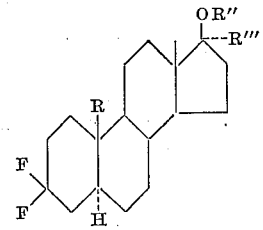

wherein R is selected from the class consisting of hydrogen and methyl, R″ is selected from the class consisting of hydrogen and the acyl group of a hydrocarbon carboxylic acid containing from 1 to 12 carbon atoms, inclusive, and R‴ is selected from the class consisting of an alkenyl radical containing from 1 to 4 carbon atoms, inclusive, and an alkynyl radical containing from 1 to 4 carbon atoms, inclusive.

7. 19-nor-3,3-difluoro-17α-ethynyl-5α-androstan-17β-ol.

References Cited by the Examiner

Grenville et al., "J. Chem. Soc." (1957), pages 4105–11.

LEWIS GOTTS, *Primary Examiner.*

L. H. GASTON, *Examiner.*